United States Patent [19]
Dees

[11] Patent Number: 5,178,218
[45] Date of Patent: Jan. 12, 1993

[54] METHOD OF SAND CONSOLIDATION WITH RESIN

[75] Inventor: John M. Dees, Richardson, Tex.

[73] Assignee: Oryx Energy Company, Dallas, Tex.

[21] Appl. No.: 718,346

[22] Filed: Jun. 19, 1991

[51] Int. Cl.$^5$ .................. E21B 33/138; E21B 43/26; E21B 43/263

[52] U.S. Cl. .................. 166/281; 166/284; 166/288; 166/295; 166/297; 166/299

[58] Field of Search ............... 166/281, 295, 297, 299, 166/284, 317, 375, 300, 288, 63

[56] References Cited

U.S. PATENT DOCUMENTS

| | | | |
|---|---|---|---|
| 2,163,449 | 6/1939 | Owsley et al. | 166/281 |
| 2,366,036 | 12/1944 | Leverett et al. | 166/295 |
| 2,689,008 | 9/1954 | Allen et al. | |
| 2,693,856 | 11/1954 | Allen | |
| 2,718,264 | 9/1955 | Allen et al. | |
| 2,766,828 | 10/1956 | Rachford, Jr. | 166/297 |
| 3,416,603 | 12/1968 | Bernard | 166/295 |
| 3,419,070 | 12/1968 | Ernst | 166/281 X |
| 3,431,977 | 3/1969 | East et al. | 166/281 |
| 3,437,143 | 4/1969 | Cook | 166/297 X |
| 3,517,745 | 6/1970 | Suman, Jr. | 166/297 |
| 3,820,604 | 6/1974 | Karnes | 166/297 |
| 3,856,094 | 12/1974 | Davis | 166/297 |
| 3,939,927 | 2/1976 | Bohn | 166/297 |
| 4,009,757 | 3/1977 | Vann | 166/276 |
| 4,105,073 | 8/1978 | Brieger | 166/297 X |
| 4,187,909 | 2/1980 | Erbstoesser | 166/284 |
| 4,374,543 | 2/1983 | Richardson | 166/317 X |
| 4,658,902 | 4/1987 | Wesson et al. | 166/317 |
| 4,936,385 | 6/1990 | Weaver et al. | 166/299 X |

OTHER PUBLICATIONS

Geo. O. Suman, Jr., *World Oil's Sand Control Handbook*, pp. 47-53 (1975).

*Primary Examiner*—George A. Suchfield
*Attorney, Agent, or Firm*—Pravel, Gambrell, Hewitt, Kimball & Krieger

[57] ABSTRACT

Methods are provided for chemically consolidating subterranean formations around wells using resins. Resins are forced into the formations by high pressures instantaneously applied when perforations are formed in casing in wells or when pressures are released from tubing in wells. Perforating, explosives or gas generators may be used in addition to the high pressures for driving resins into formations. The resins are polymerized to form permeable consolidated zones around wells.

32 Claims, 1 Drawing Sheet

METHOD OF SAND CONSOLIDATION WITH RESIN

BACKGROUND OF THE INVENTION

1. Field of the Invention

The present invention relates to a method of chemical sand control in wells drilled through subterranean formations. More specifically, the method comprises instantaneous application of pressure to drive a resin from a wellbore into the formation, the pressure being greater than a selected value, and subsequently driving the resin into the formation. Perforating means or explosives in the wellbore may subsequently be used to assist in driving the resin into the formation.

2. Description of Related Art

Hydrocarbons are often found in unconsolidated rocks. These rocks are usually relatively young in geologic age, and are unconsolidated because natural processes have not cemented the rock grains together by mineral deposition. Vast amounts of oil and gas are produced from these unconsolidated rocks, the most notable production being along the Gulf Coast of the United States, in the Gulf of Mexico, in the North Sea and in several other areas of the world.

To produce oil and gas from these reservoirs, it is necessary to employ "sand control" methods in the wells. There are two types of sand control methods---mechanical and chemical. Mechanical methods employ filter-type devices which are placed in the well opposite the unconsolidated sand and which prevent movement of rock grains into the wellbore. Such methods are sometimes successful, but the filter materials often plug or erode. Chemical methods employ a liquid resin which is injected from a wellbore into the unconsolidated rock surrounding the well. The resin is catalytically polymerized to form a porous, permeable rock mass. With most resins, it is necessary to inject a displacement fluid, which is a fluid following the resin which is not miscible with the resin. The purpose of this displacement fluid is to reduce the saturation of the resin in the rock to a lower value, which increases permeability to flow through the consolidated mass. The catalyst for the polymerization may be included in the resin or it may be injected in the displacement fluid. Several types of resins are presently used in the sand control art. These include furan, epoxy, phenolic, phenolic-furfuryl, and phenol-formaldehyde resins.

Chemical methods have several important advantages over mechanical methods, but the high cost of the resins and the difficulties in obtaining sufficiently uniform injection of chemicals have limited application to relatively short intervals of perforations. In some unconsolidated reservoirs where production is marginal, the high cost of chemical sand control has prevented recovery of the oil or gas. The paper "Sand Control, Part 7, Consolidating Formation Sand by Chemical Methods Requires Precise Application and Careful Fluid Handling," *World Oil*, May, 1975, pp. 47-53, is a summary of the many factors that must be considered in chemical sand control.

In conventional oil field practices, soon after a well is drilled, casing is placed in the well and cemented in place through the zone of interest. The casing must be perforated to allow production of fluids from the well. Sometimes perforating means, usually a perforating gun, which may be shaped charge or bullet gun, is used inside casing with no other pipe in the well. More often, tubing is run into the well to the desired depth, the drilling fluid is displaced by another fluid, a packer on the tubing is activated to seal the annulus outside the tubing and above the packer to pressure, and a perforating gun is lowered into the well to the desired depth to perforate the casing. The fluid in the wellbore at the depth to be perforated when the perforating gun is fired is called the "perforating fluid" or "completion fluid." When the casing is perforated without tubing in the well, the pressure in the casing is usually raised to a value greater than fluid pressure in the formation before perforating. This is called "overbalanced perforating." Perforating fluids that do not contain solid particles which plug perforations are normally recommended as perforating fluids.

When tubing is in the well, pressures in the well are often adjusted to make pressure inside the wellbore less than the formation fluid pressure when the well is perforated. This is called "underbalanced perforating." A "through-tubing" perforating gun is used. The technique is used to minimize plugging of the perforations from solids in the wellbore fluid and to assist in clearing perforations of debris. (See *Production Operations*, Vol. 1, Chap. 7, by Allen, T. O. and Roberts, A. P., Oil and Gas Consultants International, Inc., Tulsa, 1978.) If underbalanced perforating is not used, special back flow and surging techniques have often been recommended to clean the perforations of solids before chemicals are injected for sand control. A sand control resin has not heretofore been considered as a perforating fluid. The effect of producing a well before sand control is practiced is often that sand will be produced and the formation around the well can then collapse or move toward the wellbore. This disturbance of the near wellbore region may have long term detrimental effects resulting from increased flow of solids toward the well.

Prior art methods of injecting sand control chemicals into formations have required pumping large amounts of fluids. Common practice has been to treat a well for sand control soon after perforating, sometimes after a short production time to help clean the perforations. Large volumes of chemical resins are generally necessary to insure that resin enters every perforation. If every perforation is not treated, sand particles may flow from even a single perforation in sufficient quantity to cause the well to cease production. Experts often suggest that resin be injected into the formation in amounts of about 100 gallons per foot of perforations in an effort to treat the formation. The resins cost as much as $40 to $50 per gallon, so the cost of chemicals for the prior art sand control methods is quite high. High costs have prevented economic production of some unconsolidated zones. Also, it is sometimes necessary to control sand production even before a new well can be tested. The high cost of prior art methods of sand control, either mechanical or chemical, can discourage testing of some zones.

U.S. Pat. No. 2,693,856 discloses use of clean fluids (those which will not plug perforations) to replace drilling fluid in wellbores before the casing in the well is perforated. Controlled density fluids such as gelled oils, acid and other gelled liquids are described. The well pressure is controlled by having fluid densities in the wellbore to produce hydrostatic pressures greater than the pressure in the formation to be perforated. After perforating, the clean fluids enter the formation around the well.

U.S. Pat. No. 2,718,264 discloses a method of firing a perforating gun when the gun is surrounded by cement in the cased wellbore. The gun is placed opposite a zone that is to be sealed or isolated from a separate producing interval in the well. The cement is said to be forced practically simultaneously through the newly formed perforations and into fractures in the formation by the force of the perforating process.

U.S. Pat. No. 2,689,008 discloses a method of forcing cement or cementitious material through preexisting perforations by igniting a high explosive in the wellbore above the perforations. A shaped charge directed downward and placed above the perforations is preferred. The purpose of the cementitious material is to permanently plug the preexisting perforations.

U.S. Pat. No. 4,009,757 discloses a method of completing an unconsolidated production zone by perforating into the zone with a polymeric material in the wellbore which sets to form a porous mass in the perforations and the wellbore.

There is a significant need for a method of sand control which provides perforations free of plugging material, places resin for sand control effectively through all perforations and into the formation, and allows the use of smaller amounts of resin and less equipment at a well to decrease costs.

SUMMARY OF THE INVENTION

In one embodiment of this invention, resin or a resin solution for sand consolidation is placed in a cased well before the casing is perforated. A higher density preflush liquid may be placed below the resin and a lower density displacement fluid may be placed above the resin in the wellbore. The pressure in the wellbore fluid at the depth to be perforated is increased to a value at least higher than the fluid pressure in the formation before perforating, but may be increased to a value higher than the formation fracturing pressure at the depth of the perforations. The casing is perforated with through-tubing or tubing-conveyed perforating means. After perforating, explosives or gas generators may be activated in the wellbore and fluid may be injected at the surface to force additional fluid through the perforations.

In another embodiment, tubing is present in a well in which the casing has previously been perforated, the tubing having means to contain high pressure, resin is placed in the tubing and pressured such that when pressure is instantaneously released from the tubing the pressure in the wellbore is at least greater than the fluid pressure in the formation and may be above the fracturing pressure of the formation to be treated and pressure is released from the tubing.

DESCRIPTION OF THE PREFERRED EMBODIMENTS

Figures 1, 2:
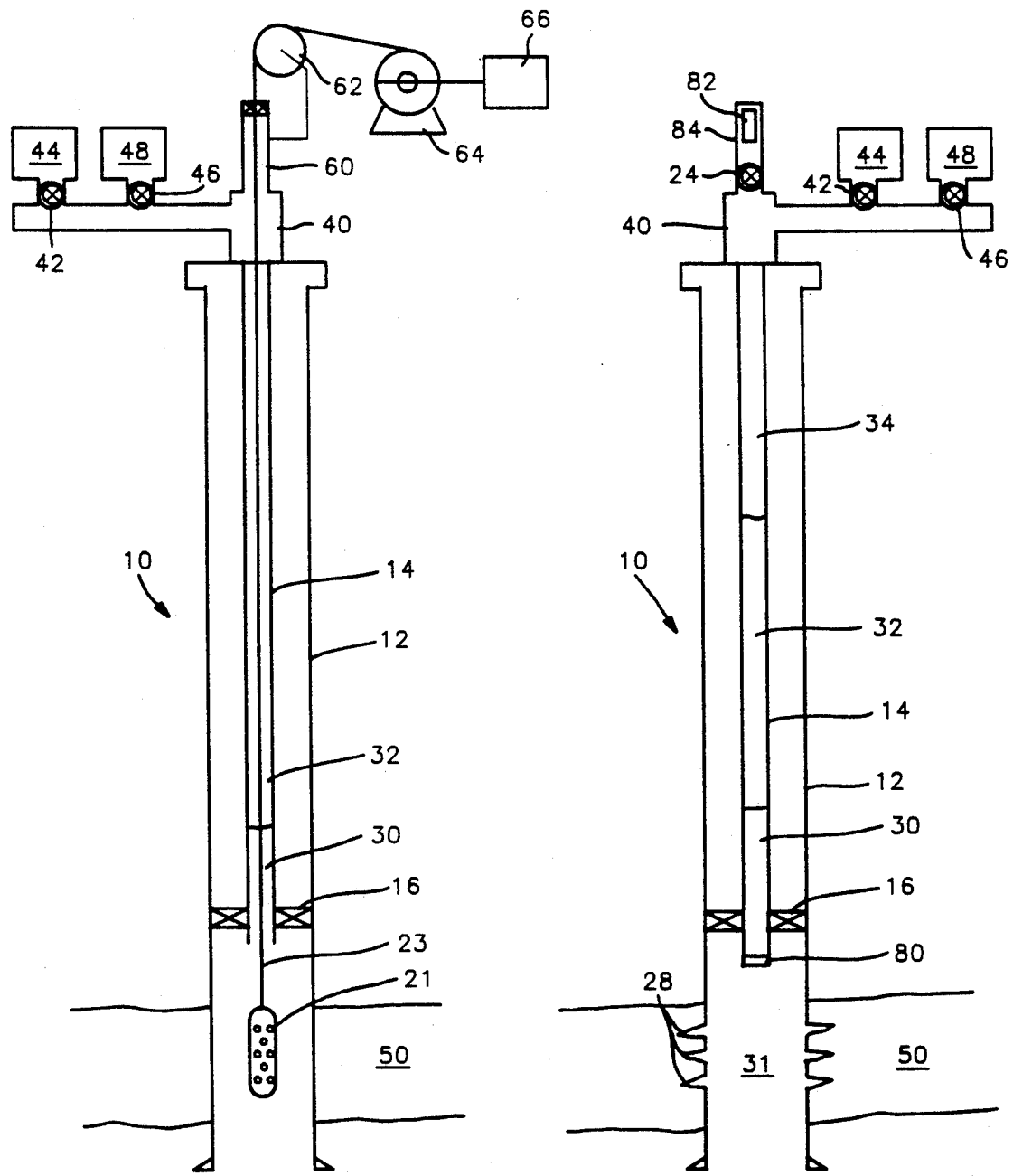
FIG. 1 is a diagrammatic sketch of a wellbore containing unperforated casing with resin surrounding perforating means in the wellbore, along with surface equipment.
FIG. 2 is a diagrammatic sketch of a wellbore containing tubing having a means on the lower end of the tubing for containing high pressure, along with surface equipment.

Referring now to FIG. 1, a well 10 is drilled through an unconsolidated formation 50. The wellbore contains casing 12 and tubing 14. The annulus between the tubing 14 and casing 12 is sealed with the packer 16. A means for perforating 21 has been placed opposite the formation 50 by use of the wireline 23. The wireline passes over the sheave 62 to a reel mechanism 64 and is connected to control center 66, from which the perforating means 21 is activated. Pressure inside the tubing is sealed by lubricator apparatus 60. Pumps 44 and 48 are connected through valves 42 and 46, respectively, to wellhead 40. Resin solution 30 has been pumped into the lower part of the wellbore opposite the formation 50 which is to be consolidated. Displacement fluid 32 has been placed in the wellbore immediately above the resin solution 30. Displacement fluid 32 maintains its position above the resin because of a lower density of the displacement fluid 32 than the resin solution 30. A rathole fluid (not shown) more dense than the resin solution may be placed in the wellbore below the depth where perforations are to be formed. The fluids in the wellbore may be placed by pumping them down the well before the packer is set or sealed, using surface pumps 44 and 48, connected through valves 42 and 46, or the fluids may be placed by use of a wireline bailer or by coil tubing. The fluids other than the resin solution 30 may be water-based or oil-based, depending on the type of resin being injected. The density of the water-based fluids is controlled by addition of salts, water-miscible solvents or other methods well-known in the art. The density of oil-based fluids is controlled by mixtures of solvents of different densities or other methods well-known in the art. The difference in density of fluids in contact in the wellbore to obtain stable positions of the fluids by gravity force is preferably at least about 0.2 pounds per gallon of fluid.

Perforating means 21 has been lowered on wireline 23 running over sheave 62 using reel mechanism 64. Perforating means 21 is placed at a depth opposite at least a part of the formation 50. The perforating means may be any of several types of perforating guns well-known in the art, including shaped charge and bullet guns or high-pressure fluid streams.

The casing is pressured by injecting a lower density fluid, preferably a gas phase or a liquid-gas mixture (not shown), or by increasing the height of the column of displacement fluid 32. The pressure in the tubing is increased to a selected value such that the pressure in the resin solution 30 at the depth of the top of the perforating means is at least higher than the fluid pressure in the formation 50. The pressure in the formation 50 is determined by pressures in nearby wells, by measurements made before the casing 12 was placed in the well 10, or from other geologic information available and well-known in the art. Perforating of the casing will then be "overbalanced perforating," and the resin solution will serve as the "perforating fluid," as these terms were herein defined.

The pressure in resin solution 30 should be at least greater than the formation pore pressure before perforating, to cause resin around the perforating means to flow into each of the new perforation tunnels. The use of resin solution as a perforating fluid improves the efficiency of resin placement in each perforation. Displacement fluid 32 will serve to reduce the saturation of resin in the formation and thereby to enhance the permeability of the consolidated formation. Surfactants, coupling agents and diluents in the resin solution may further enhance this retained permeability and improve the consolidated sand strength.

Preferably, the pressure in the resin 30 at the depth of the top of the perforating means is increased to a value greater than the minimum fracturing pressure of the formation 50. This pressure is determined by minimum fracturing pressures in nearby wells or by other geologic information. If no such data are available, it can be assumed that the minimum fracturing pressure in formation 50 is 0.7 psi per foot of depth, which is an average value for many formations. More preferably, the pressure in the resin 30 at the depth of the top of the perforating means is increased to a value higher than the fracturing pressure to overcome the overburden stress in the earth, which has a value of about 1.0 psi per foot of depth for many formations. This higher pressure can cause a more even distribution of the resin to all perforations formed and can allow more debris to be flushed into the fracture from the perforations after they are formed.

Although I have discovered that unconsolidated or loosely consolidated sands can be treated with resin under pressures exceeding fracturing pressures of the formation treated, the treating with resins under fracturing conditions has not been recommended by experts in the past. See, for example, "Sand Control, Part 7—Consolidating Formation Sand by Chemical Methods Requires Precise Application and Careful Fluid Handling," *World Oil*, May, 1975, pp. 51-52.

After the selected pressure has been reached in the resin surrounding the perforating means, perforating means 21 is activated by the control 66. Resin enters the formation 5 and is displaced by displacement fluid 32. Displacement fluid 32 is lower in density than the resin 30 and may contain a catalyst for polymerization of the resin 30. The difference in density is preferably at least 0.2 pounds per gallon of fluid. Displacement fluid 32 decreases the saturation of resin solution 30 in the formation 50 such that permeability to fluid flow through the formation after consolidation will be increased. A fluid (not shown) having a lower density than displacement fluid 32 by at least 0.2 pounds per gallon of fluid is used to drive the lower fluids from the wellbore and into the formation 50. This lower density fluid may be a liquid pumped from the surface by pump 44 or pump 48. Preferably, the lower density fluid contains a gaseous phase. This fluid may be nitrogen, which may be used to gasify a liquid which is pumped into the well. The compressibility of the gaseous phase allows more continuous injection of fluid through the perforations immediately after activation of the perforating means 21. Injection of the lower density fluid after activation of the perforating means 21 may continue to drive the resin solution 30 and displacement fluid 32 into the formation 50.

After the initial perforations in the casing are formed, additional devices are useful for driving the resin or displacing fluid into the formation. One such device is a perforating gun, such as may be used for forming the initial perforations. Activation of a perforating gun to form additional perforations in the casing in the same interval as the initial perforations is useful to divert fluids to all perforations. Activation of explosives such as RDX, HMX, and PIX inside the casing in proximity to the perforations is useful to drive the fluids through all perforations. Activation of propellants such as M-5 and HXP-100 or other modified nitrocellulose propellants or propellants of the modified or unmodified nitroamine class is also useful to divert the fluids to all perforations and drive the fluids through the perforations more uniformly. These propellants are used in commercial devices called "gas generators," which are available from Servo-Dynamics, Inc. of Santa Barbara, Calif. All such perforating guns, explosives, propellants or gas generators can be placed by lowering on a wire line such as the wire line 23 of FIG. 1 and activating through a control such as 66 of FIG. 1.

If more than one zone is to be consolidated by the method of this invention, it is necessary to prevent flow of the resin or other fluids into the zone previously consolidated. This is normally accomplished by mechanical devices such as bridge plugs and retrievable packers which are placed at appropriate depths in the well using well-known techniques. Existing perforations may also be temporarily plugged using particulate materials and other sealers known in industry. Any diverting method which prevents fluid flow into perforated zones in the wellbore while the additional zone is treated is suitable.

In another embodiment of this invention, a pre-flush fluid is placed in the casing at the depth where perforations are to be formed. The resin is then placed in the wellbore above the pre-flush fluid. The pre-flush fluid has higher density than the resin, preferably at least 0.2 pounds per gallon higher. The pressure in the pre-flush liquid when the perforating means is activated is selected to be greater than formation fluid pressure and preferably higher than formation fracturing pressure, as described above. Procedures as described previously for injecting the fluids are applied.

Although the perforating means of FIG. 1 is shown attached to wireline 23, it is possible to place the perforating means in a well attached to the tubing. Such tubing-conveyed perforating means are well-known in industry. The tubing can be placed in the well when sealed on the bottom and resin and other fluids such as a displacement fluid and nitrogen can be used to pressure the tubing. Alternatively, resin can be placed in the casing before the tubing-conveyed perforating gun is run into the well. Additional resin can then be placed in the tubing along with displacement fluid and nitrogen. Various means, such as dropping of a bar down the tubing or a pressure-activated device, are available for opening the bottom of the tubing and firing the perforating gun. After the perforating gun is fired, additional fluid can be injected from the surface to displace the resin solution into the formation or to catalyze the polymerization of the resin.

Referring to FIG. 2, illustrating yet another embodiment of this invention, a well 10 contains casing 12 and tubing 14. Perforations 28 exist in the casing 12 opposite the formation 50 to be consolidated. The tubing 14 in the well has a device 80 near the lower end of the tubing to contain pressure inside the tubing until it can be instantaneously released and applied to the formation to be consolidated. The device 80 may be a valve which can be opened and closed by manipulation of pressure in the annulus above the packer 16. Such a device is sold commercially under the names LPRN and APR valves by Halliburton Services of Duncan, OK. Alternatively, the device 80 may be a diaphragm which is selected to burst at a pre-selected pressure differential. As yet another alternative, the device 80 may be a diaphragm which is ruptured at the selected time by a bar 82 which is released through valve 24 in a pressure head 84. The device 80 may be placed at any location in the lower portion of the tubing, but preferably is placed near the lower end of the tubing.

Fluid 31 is placed in the well before the packer 16 is set or is fluid previously produced from the formation. Packer 16 is not necessary if the casing 12 will safely retain the pressure to be applied to the perforations 28, but normally packer 16 is used. Pressure is increased in the tubing by pumping in fluids. Fluid 30 may be a pre-flush fluid or may be resin solution. Fluid 32 may be resin solution or a displacement fluid. Fluid 34 may be displacement fluid or may be a fluid having a gaseous phase. The order in which fluids enter the formation is pre-flush fluid, resin solution, displacement fluid and gaseous phase, if pre-flush fluid is utilized. A density difference of at least about 0.2 pounds per gallon of fluid is maintained to achieve gravity stabilization of the position of the fluids in the wellbore. The fluids are pumped into the tubing by pumps 44 or 48 through control valves 42 or 46, respectively, and wellhead 40.

Pressure inside the tubing is preferably increased until release of the tubing pressure will cause the pressure at the perforations 28 to be higher than the fracturing pressure of the formation 50. Alternatively, the pressure may be increased such that the pressure will be higher than 0.7 psi per foot of vertical depth of the top of the perforations 28. More preferably, pressure inside the tubing is increased such that the pressure will be higher than 1.0 psi per foot of vertical depth of the top of the perforations 28 immediately after pressure inside the tubing is released. The device 80 is then opened. Fluid 34 may be injected from the surface to maintain fracturing pressures at the perforations 28 for a selected time. Preferably, a gaseous phase is present in the tubing such that pressure is maintained more uniformly and under fracturing conditions such that the consolidating fluids are diverted more evenly to all perforations and debris is swept from the perforations into the fractures created.

Resins used in the various embodiments of this invention, including those illustrated in FIG. 1 and FIG. 2, may be selected from commercial resins used for sand consolidation. These include furan, epoxy, phenolic, phenolic-furfuryl and phenol-formaldehyde resins. A preferred resin is an acid-curable furan resin. In preferred embodiments of the present invention, resin solution 30 is comprised of one of the resins described above with a diluent additive such as furfuryl alcohol, butyl lactate, and esters of phthalic, oxalic, maleic and succinic acids. The resin diluent can comprise substantially any of the known diluent compounds. Such resin diluents can serve to induce a variety of desirable properties to the resin solution. Lower viscosity of the resin solution, improved dispersibility and improved sand grain coating, resulting in improved compressive strength and higher retained permeability of the consolidated sand are examples of improvements resulting from diluents.

The resin solution 30 may also include a coupling agent to promote strong resin-to-sand grain bonding. Organosilicon compounds are commonly used as coupling agents. A preferred compound is N-beta-(aminoethyl)-gamma-amino-propyltrimethoxy silane.

The catalyst for polymerization of the resins may be added to the resin solution 30 or may be included in the displacement fluid 32. The displacement fluid may be aqueous or hydrocarbon. The preferred displacement fluid will depend on the resin used. For example, with furan resin, the displacement fluid is aqueous and an acid such hydrochloric acid added to the aqueous fluid serves as the polymerization catalyst. For epoxy resins, the displacement fluid is normally hydrocarbon and the resin may be internally catalyzed by a catalyst in the resin solution or externally catalyzed by a catalyst in the displacement fluid. Surfactants added to the resin or the displacement fluid may be used.

The above-described invention will be further described and illustrated by the following examples, offered for the purpose of illustration and not limitation.

EXAMPLE 1

A furan resin, such as the product sold by OTIS Sand Control under the trade name "HYDROFIX," is used. The resin solution has a density of 9.4 ppg (pounds per gallon) and contains surfactant, diluent and coupling agents with the resin. The displacement fluid is field salt water, having a density of 9.1 ppg. A rat-hole fluid is placed below the resin and below the depth at which perforations will be formed. This fluid is field salt water with added salt to increase the density to 10.5 ppg. The fluids are placed in the wellbore using a string of tubing open at the bottom which can be lowered to any desired depth, using procedures well-known in the art. The volume of treating resin is selected such that the perforations to be formed will receive an effective amount of resin, selected to be 15 gallons per foot of the productive zone to be treated. The volume of displacement fluid is selected to insure that pressure in the casing when it is perforated will be higher than reservoir pressure.

After the fluids are in place, a perforating gun is lowered on wire line to the depth to be perforated. The perforating gun is designed for deep penetration perforations. The perforating gun is fired and the fluid level in the tubing drops. The tubing is refilled with field salt water and an additional 20 barrels of water is pumped to displace resin into the perforations. The perforating gun is pulled from the well. Sixty gallons of 15 per cent hydrochloric acid per foot of productive zone is pumped into the tubing and displaced with an additional 20 barrels of field salt water. The acid causes the furan resin to polymerize and form a consolidated volume of sand in the formation. The well produces oil and water without sand in the produced fluids.

EXAMPLE 2

In another embodiment of this invention well conditions are similar to those in Example 1, but the resin is EPOSAND 112, which is an epoxy resin mixture available from Shell Company. First, 100 gallons of a mixture of an oil and carbon tetrachloride is placed in the well. This liquid has a density higher than the 9.1 ppg of the resin solution. Then 212 gallons of the resin solution is placed and the tubing is filled with diesel oil having a density of 6.5 ppg. A perforating gun previously lowered into the well is fired, the tubing is filled with diesel oil and 20 barrels additional oil is pumped. The well is left undisturbed for 8 hours to allow the resin to cure. The well is then produced without sand production.

EXAMPLE 3

A well in South Texas was to be recompleted in an unconsolidated or loosely consolidated oil-containing sand above lower depleted sands. A bridge plug was set in the 5½ inch casing above the depleted sands. Tubing having gas lift valves and a packer was run into the well and 212 gallons of HYDROFIX furan resin solution was spotted above the bridge plug in the casing. The resin solution contained 0.5 per cent surfactant, 50 per cent diluent, and 0.5 per cent coupling agent by volume with the resin. The resin was followed with field salt water pumped through the 2⅜ inch tubing. The packer was pulled up to a depth of 5000 feet and set. A 2⅜ inch JUMBO JET perforating gun was run through the tubing to a depth of 5415 to 5421 feet, opposite the target sand. Nitrogen gas was injected down the tubing until surface pressure in the tubing was 4000 psi. The perforating gun was then fired to form four perforations per foot over a 6 foot interval. Pumping of nitrogen was commenced to pump 30 MCF of nitrogen. The perforating gun was raised to 5200 feet and a mixture of field salt water and nitrogen was injected with each phase at approximately 0.5 barrels per minute. The field salt water was replaced with 15 per cent hydrochloric acid and total rate increased to 1.5 barrels per minute until 1,000 gallons of acid was injected. This acid-nitrogen mixture was followed by field salt water to displace the nitrogen and kill the well. The packer was then released and lowered to 5250 feet. The well was placed on production with gas lift and tested. Production was free of sand.

EXAMPLE 4

A well located offshore in the Gulf of Mexico is completed in what is expected to be an unconsolidated or loosely consolidated gas-bearing sand. It is desired to test the well to determine its flow capacity. Therefore, a sand consolidation treatment is needed which at least will temporarily prevent flow of sand into the well when it is produced for testing. Also, a small sand consolidation treatment when the well is perforated is expected to improve the lifetime of a gravel pack in the well if gravel-packing is needed later. The production casing is run from 11,000 feet to surface. Tubing is run into the well and 316 gallons of HYDROFIX furan resin solution is spotted in the casing across the prospective producing interval. Tubing is tripped out and back in to attach a VANN tubing-conveyed perforating system and packer. The packer is positioned and set to place the perforating guns with resin surrounding them across the desired interval to be tested. The setting of the packer is tested and the tubing is loaded with an additional 212 gallons of HYDROFIX furan resin. Tubing is pressured with nitrogen to a pressure at the surface of 9,000 psi, resulting in a bottom-hole pressure of about 10,000 psi. A delayed pressure-firing mechanism triggers the detonation of the guns and the sand is perforated. Surface pressure drops to about 8,000 psi very rapidly after perforating. Pumping of nitrogen begins at 10,000 cubic feet per minute along with 3 barrels per minute of filtered brine. After 12 barrels of brine is pumped, 88 barrels of 10 per cent acetic acid is pumped along with nitrogen. After the acid is pumped, nitrogen is discontinued and tubing is flushed with filtered brine at 8 barrels per minute. The well is placed on production and tested without sand.

The methods of the present invention and its advantages will be understood from the foregoing description and it will be apparent that many changes may be made in the procedures thereof without departing from the spirit and scope of the invention, the forms herein described being merely preferred or exemplary embodiments.

I claim:

1. A method of consolidating a subterranean formation surrounding unperforated casing comprising the steps of:
   (a) placing a resin in the casing opposite at least a portion of the formation to be consolidated;
   (b) increasing the pressure in the resin opposite the formation to be consolidated to a pressure greater than the minimum fracturing pressure of the formation to be consolidated;
   (c) positioning means for perforating the casing in the resin opposite the formation to be consolidated;
   (d) activating the perforating means to form at least one perforation in the casing; and
   (e) polymerizing the resin in the formation.

2. The method of claim 1 wherein in step (b) the pressure in the resin is increased to a pressure at least as high as 0.7 psi per foot of vertical depth to the top perforation.

3. The method of claim 1 wherein in step (b) the pressure in the resin is increased to a pressure at least as high as 1.0 psi per foot of vertical depth to the top perforation.

4. The method of claim 1 wherein the resin is selected from the group consisting of furan, epoxy, phenolic, phenolic-furfuryl, and phenol-formaldehyde.

5. The method of claim 1 wherein the resin is furan.

6. The method of claim 1 wherein a displacement fluid is placed above the resin in the wellbore before step (d).

7. The method of claim 1 wherein a gas phase is placed in the casing before step (d).

8. The method of claim 1 further comprising the step following step (d) and before step (e):
   activating additional perforating means in the wellbore opposite the formation to be consolidated.

9. The method of claim 1 further comprising the step following step (d) and before step (e):
   activating explosive other than perforating means in the wellbore.

10. The method of claim 1 further comprising the step following step (d) and before step (e):
    activating a gas generator other than perforating means in the wellbore.

11. A method of consolidating subterranean formation surrounding unperforated casing comprising the steps of:
    (a) placing a pre-flush liquid in the casing opposite the formation to be consolidated;
    (b) placing a resin above the pre-flush liquid in the wellbore, the resin being polymerizable;
    (c) increasing the pressure in the casing opposite the formation to be consolidated to a pressure greater than the minimum fracturing pressure of the formation to be treated;
    (d) placing a means for perforating in the casing opposite the formation to be consolidated;
    (e) activating the means for perforating to form at least one perforation in the casing; and
    (f) polymerizing the resin in the formation.

12. The method of claim 11 wherein in step (c) the pressure in the liquid opposite the formation to be treated is increased to a pressure of at least 0.7 psi per foot of vertical depth to the top perforation.

13. The method of claim 11 wherein in step (c) the pressure in the liquid opposite the formation to be treated is increased to a pressure of at least 1.0 psi per foot of vertical depth to the top perforation.

14. The method of claim 11 wherein the resin is selected from the group consisting of furan, epoxy, phenolic, phenolic-furfuryl, and phenol-formaldehyde.

15. The method of claim 11 wherein the resin is furan.

16. The method of claim 11 wherein a displacement fluid is placed above the resin in the casing before step (e).

17. The method of claim 11 wherein the displacement fluid contains a catalyst for polymerization of the resin.

18. The method of claim 11 further comprising the step after step (e) and before step (f):
   activating additional perforating means in the wellbore opposite the formation to be treated.

19. The method of claim 11 further comprising the step after step (e) and before step (f):
   activating explosive other than perforating means in the wellbore.

20. The method of claim 11 further comprising the step after step (e) and before step (f):
   activating a gas generator other than perforating means in the wellbore.

21. The method of claim 11 further comprising the step after step (e) and before step (f):
   injecting a fluid at the surface to displace the resin into the formation to be consolidated.

22. A method of consolidating a subterranean formation surrounding a cased well having casing extending at least partially through the formation and having perforations in the casing into the formation comprising the steps of:
   (a) placing tubing in the well, the tubing having therein means for containing high pressure, the means being located in proximity to the lower end of the tubing;
   (b) placing a resin in the tubing;
   (c) pressuring the tubing to a pressure such that the pressure at the formation will be greater than fracturing pressure in the formation when the means for containing high pressure is opened; and
   (d) opening the means for containing high pressure such that pressure is instantaneously applied to the formation through the perforations; and
   (e) polymerizing the resin in the formation.

23. The method of claim 22 wherein a displacement fluid is injected into the formation following the resin.

24. The method of claim 22 wherein in step (c) the tubing is pressured with a gas phase.

25. The method of claim 22 wherein the resin is selected from the group consisting of furan, epoxy, phenolic, phenolic-furfuryl, and phenol-formaldehyde.

26. The method of claim 22 wherein the resin is furan.

27. A method of consolidating a subterranean formation surrounding unperforated casing comprising the steps of:
   (a) placing a resin in the casing opposite at least a portion of the formation to be consolidated;
   (b) placing a perforating gun opposite the formation to be consolidated by connecting the gun to a tubing string and running the tubing string into the well;
   (c) pressuring the tubing to a pressure such that the pressure at the formation is greater than the minimum fracturing pressure of the formation when the casing is perforated;
   (d) activating the perforating gun; and
   (e) allowing the resin to flow into the formation and polymerizing the resin.

28. The method of claim 27 wherein the resin is selected from the group consisting of furan, epoxy, phenolic, phenolic-furfuryl, and phenol-formaldehyde.

29. The method of claim 27 wherein in step (b) the tubing string additionally comprises a packer and the packer is set in the casing.

30. The method of claim 27 wherein the fluid used to pressure the tubing in step (c) is nitrogen.

31. The method of claim 27 wherein a displacement fluid is injected into the formation following the resin and before the resin is polymerized.

32. A method of consolidating a subterranean formation surrounding casing which has previously been perforated comprising the steps of:
   (a) preventing flow through existing perforations in the casing;
   (b) placing a resin in the casing opposite at least a portion of the formation to be consolidated;
   (c) increasing the pressure in the resin opposite the formation to be consolidated to a pressure at least as high as the minimum fracturing pressure of the formation to be consolidated;
   (d) positioning means for perforating the casing in the resin opposite the formation to be consolidated;
   (e) activating the perforating means to form at least one additional perforation in the casing; and
   (f) polymerizing the resin in the formation.

* * * * *